United States Patent [19]
Cross et al.

[11] 3,729,738
[45] Apr. 24, 1973

[54] SPECTRUM ANALYZERS

[75] Inventors: Malcolm Geoffrey Cross, Chelmsford; Joseph Thomas Barrow Musson, Westcliff-on-Sea, both of England

[73] Assignee: The Marconi Company Limited, London, England

[22] Filed: Aug. 16, 1971

[21] Appl. No.: 172,054

[30] Foreign Application Priority Data

Sept. 4, 1970 Great Britain..................42,375/70

[52] U.S. Cl..............343/5 SA, 324/77 C, 324/77 CS
[51] Int. Cl. .............................................G01r 23/16
[58] Field of Search..................343/5 SA; 324/77 C, 324/77 CS; 331/178

[56] References Cited

UNITED STATES PATENTS

| 2,954,465 | 9/1960 | White | 324/77 CS |
| 2,941,202 | 6/1960 | Harris, Jr. et al. | 343/5 SA |
| 3,210,656 | 10/1965 | Lent | 324/77 C |

Primary Examiner—Robert F. Stahl
Assistant Examiner—G. E. Montone
Attorney—Donald M. Wight et al.

[57] ABSTRACT

A spectrum analyzer of the type where input signals to be analyzed are mixed with a repeatedly swept frequency signal so that output signals are provided which are time related to the frequency of the input signals. The repeatedly swept frequency signal is produced by applying a train of pulses to a dispersive delay via a bandpass filter having a characteristic such that the impulse spectrum of each of the pulses in the pulse train is reduced so as to match that of the dispersive delay.

9 Claims, 3 Drawing Figures

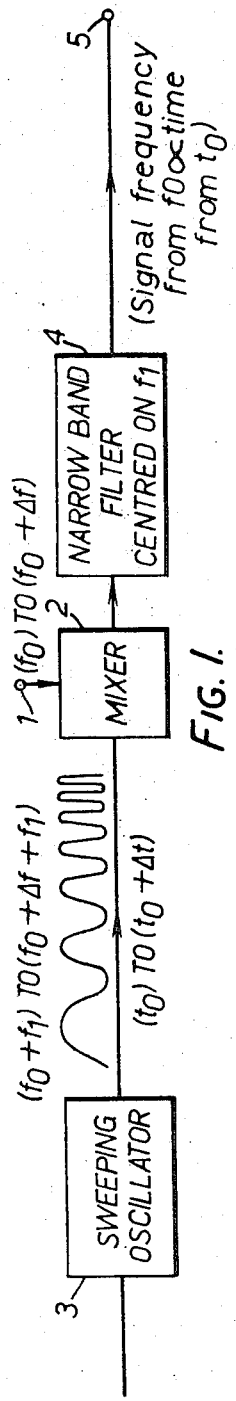
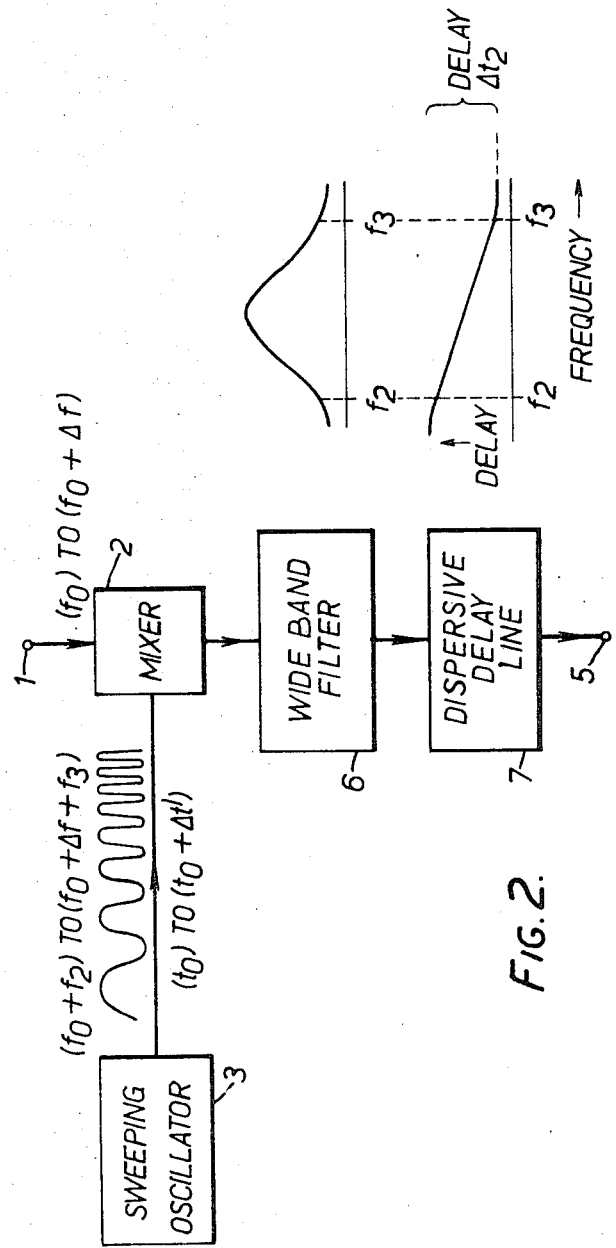
FIG. 1.
FIG. 2.
INVENTORS
Malcolm Geoffrey Cross
and
Joseph Thomas Barrow Musson
BY Baldwin Wight & Brown ATTORNEYS

SPECTRUM ANALYZERS

This invention relates to spectrum analyzers and more particularly to spectrum analyzers of the so-called "frequency sweep" type.

As is known such spectrum analyzers perform the function of converting a given range of frequencies ($f_o$ to $f_o + \Delta f$) into a time sequence ($t_o$ to $t_o + \Delta t$).

The invention is described with reference to the accompanying drawings in which

FIG. 1 is a block schematic diagram of a known frequency sweep spectrum analyzer.

FIG. 2 is a block schematic diagram of a known modified form of the frequency sweep spectrum analyzer of FIG. 1.

Figure 3:
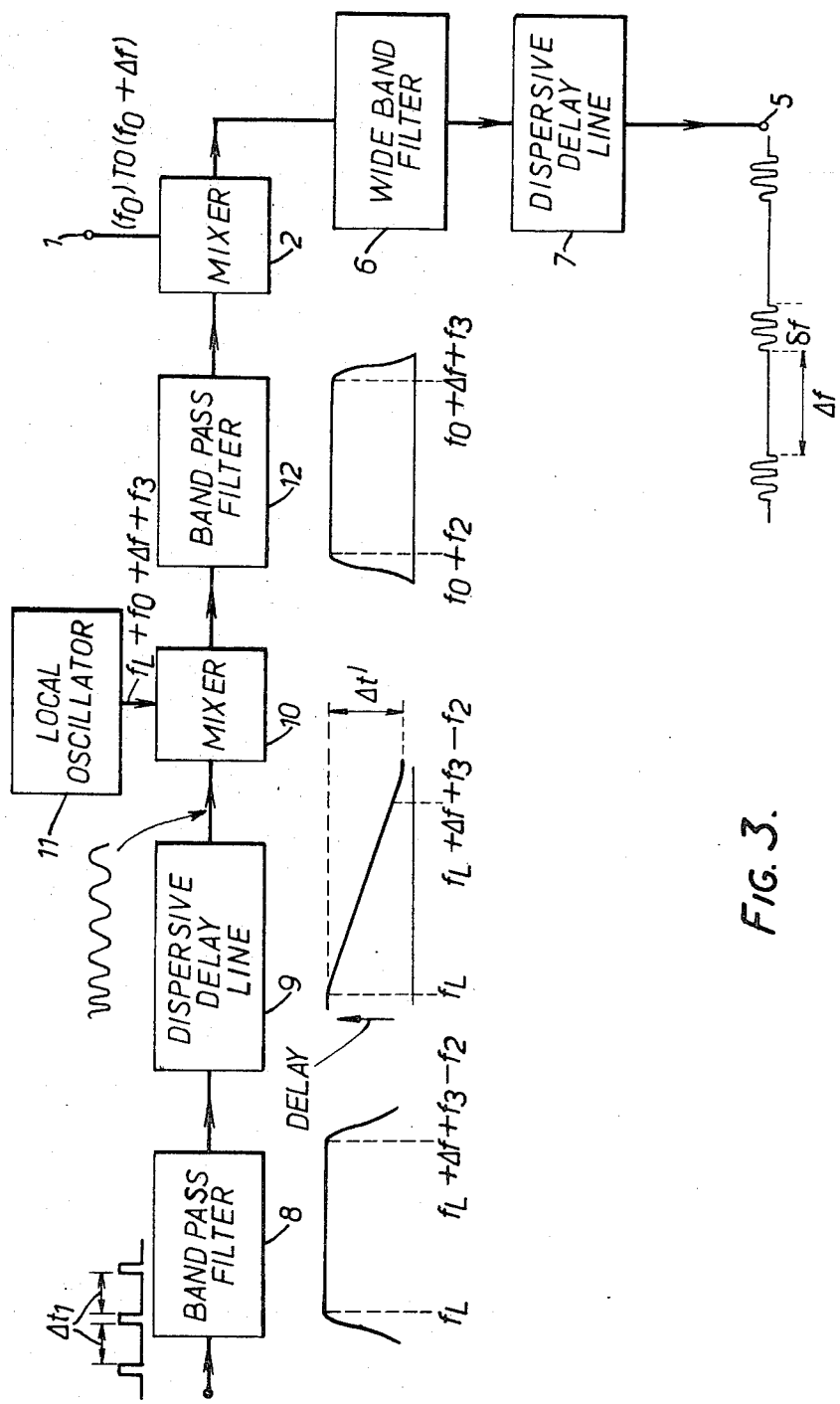
FIG. 3 is a frequency sweep spectrum analyzer in accordance with the present invention.

Referring to FIG. 1 in the typical known frequency sweep spectrum analyzer input signals of frequency within the range ($f_o$) to ($f_o + \Delta f$) are applied to an input terminal 1 and thence to a mixer 2 which derives a second input signal from a sweeping oscillator 3. Sweeping oscillator 3 provides an output signal sweeping in frequency from a frequency ($f_o + f_1$) to a frequency ($f_o + \Delta f + f_1$) in a time period of from ($t_o$) to ($t_o + \Delta t$). Output signals from mixer 2 are passed via a narrow band pass filter 4, whose pass band is centered on ($f_1$), to an output terminal 5. At output terminal 5 output frequency from $f_o$ to ($f_o + \Delta f$) is related to time from ($t_o$) to ($t_o + \Delta t$).

In the arrangement described above, the sweeping rate $\Delta f/\Delta t$ of the oscillator 3 is limited to an undesirably low value by the narrow bandwidth ($\delta f$) of the narrow band filter 4. The narrower the bandwidth ($\delta f$) of the filter 4 the slower the sweeping rate must be. This leads to inefficiency in the use made of available signal energy since an input signal just above ($f_o$) to take one example, could appear and disappear while the analyzer is exploring that part of the spectrum just below the frequency ($f_o + \Delta f$), and thus be missed altogether.

It has been proposed that to reduce this defect the narrow band filter 4 of FIG. 1 be replaced by a wide band filter 6 allowed by a dispersive delay line 7 as shown in FIG. 2. The wide band filter 6 has a pass band of from frequency $f_2$ to frequency $f_3$ while the dispersive delay line 7 has a characteristic exhibiting maximum delay at frequency $f_2$ and minimum delay at frequency $f_3$. The characteristics of both wide band filter 6 and dispersive delay line 7 are illustrated to the right (as viewed) of these two units in FIG. 2. In addition the sweeping oscillator 3 is caused to sweep from frequency ($f_o + f_2$) to ($f_o + \Delta f + f_3$). Because the bandwidth ($f_3 - f_2$) of the filter 6 is much wider than that of filter 4 in FIG. 1, the sweep time ($\Delta t^1$) of oscillator 3 may be made much shorter, approaching, indeed, the theoretical minimum. The dispersive line 7 acts to phase-compensate the output signal from the wide band filter 6 so that the final output signal at output terminal 5 is a narrow pulse, of the same resolution ($\Delta f$) as that obtained using the arrangement of FIG. 1.

However, as has been mentioned above, the sweeping oscillator 3 now has to cover a frequency range of ($\Delta f + f_3 - f_2$) which is ($f_3 - f_2$) greater than that which it has to cover in the arrangement shown in FIG. 1. The time $\Delta t^1$ for the sweep may be considered to be the sum of two parts viz.

$\Delta t_1$ for sweeping a range $\Delta f$ $\Delta t_2$ for sweeping a range $f_3 - f_2$ i.e. $\Delta t^1 = \Delta t_1 + \Delta t_2$ Hence sweeping rate $$(\Delta f + f_3 - f_2)/\Delta t^1 = \Delta f/\Delta t_1 = (f_3 - f_2)/\Delta t_2$$

The arrangement of FIG. 2, while permitting a short sweep time, itself suffers from a number of defects. Output signals are displayed at the output terminal 5 only for the time $\Delta t_1$. The time $\Delta t_2$ is "lost" which reduces the efficiency of the system. Furthermore, if a voltage-controlled oscillator is used to create the frequency sweep, a "sawtooth" type waveform is required as input to the oscillator to create the ($f_o + f_2$) to ($f_o + \Delta f + f_3$) repeating sweep. Since there is a sudden flyback of voltage at the end of a sweep, unwanted transients occur and further time must be wasted allowing the transients to die down before the next sweep is commenced. In addition, successive sweeps are not coherent. that is to say, the carrier frequency of the narrow output pulse at terminal 5 in FIG. 2 varies in phase from sweep to sweep in indeterminate fashion. This last mentioned defect is particularly serious for those applications in which further signal processing is required to be carried out which necessitates relating successive narrow output pulses to one another.

The present invention seeks to provide improved frequency sweep spectrum analyzers in which the aforementioned defects are avoided or reduced.

According to this invention, a spectrum analyzer of the kind comprising means for mixing input signals to be analyzed with a repeatedly swept frequency signal to provide output signals which are related to a time period in dependence upon the frequency of the input signals corresponding thereto, includes, for producing said repeatedly swept frequency signal, means for applying a train of relatively narrow pulses to dispersive delay means via bandpass filter means having a bandpass characteristic such as to reduce the impulse spectrum of each of said narrow pulses at least approximately to match that of said dispersive delay means, and means for applying output signals from said dispersive delay means to said mixing means.

For many purposes it is necessary to translate frequency swept signals derived at the output terminal of said dispersive delay means to a higher frequency range, closer to the frequency range of input signals to be analyzed in which case said dispersive delay means is connected to apply output signals from said dispersive delay means to a frequency mixing means to which input signals are also applied from a local oscillator, means being provided for applying translated frequency swept signals derived from said last mentioned mixing means to said first mentioned mixing means.

Normally a bandpass filter arrangement is connected between said last mentioned mixing means and said first mentioned mixing means. The last mentioned bandpass filter arrangement is provided to pass the upper of the two side bands produced by said last mentioned mixer when the arrangement is such that the frequency swept signals derived from said dispersive delay means are translated in said last mentioned mixing means to a frequency range closer to and below the frequency range of signals to be analyzed. Where the arrangement is such that the frequency swept signals derived from said dispersive delay means are translated in said last mentioned mixing means to a frequency range closer to and above the frequency range of signals to be analyzed, the last mentioned bandpass filter arrangement is provided to pass the lower of the two side bands produced by said last mentioned mixer.

Preferably at least said first mentioned mixing means is a multiplicative mixer.

Preferably again the relationship between the characteristic of said first mentioned bandpass filter arrangement and the characteristic of said dispersive delay means is such that the linear portion of the dispersive delay means extends into the skirts of the bandpass characteristic.

Preferably again, means are provided for applying output signals produced by said first mentioned mixing means to a further dispersive delay means via a wide bandpass filter arrangement whose pass band characteristic is at least approximately matched to the dispersive delay characteristic of said further dispersive delay means, means being provided for deriving said output signals for utilization from said further dispersive delay means.

Where it is required that output signals derived during different sweeps are phase coherent, means are provided for phase-locking the repeat frequency of said narrow pulses to the frequency of said local oscillator.

It is a feature of this invention that when rendered phase coherent as above described the invention may form the spectrum analyzer part of a pulse doppler radar system in which spectrum analysis of a received signal is required after range gating.

Referring to FIG. 3, in the analyzer in accordance with the present invention a generated narrow pulse is applied to a bandpass filter 8 having a pass band extending from a frequency $(f_L)$ to a frequency $(f_L + \Delta f + f_3 - f_2)$ as indicated by the characteristic drawn below the block 8. The output terminal of filter 8 is connected to a dispersive delay line having maximum delay at frequency $(f_L)$ and minimum delay at frequency $(f_L + \Delta f + f_3 - f_2)$, as indicated by the characteristic shown below block 9. $(\Delta t^1)$ is the difference between the delays at frequencies $(f_L)$ and $(f_L + \Delta f + f_3 - f_2)$. The frequency $(f_L)$ is chosen for the convenience of dispersive delay line design. The action of the bandpass filter 8 is to narrow the impulse spectrum to match that of the dispersive line 9.

In practice the generated narrow pulse should be sufficiently narrow as to provide a substantially flat spectrum over the range $(f_L)$ to $(f_L + \Delta f + f_3 - f_2)$ and the linear-delay region of the dispersive line 9 should extend into the skirts of the characteristic of the bandpas filter 8. Furthermore, any relevant phase changes caused by the bandpass filter 8 should be compensated for when designing the dispersive line 9.

As so far described, the generated narrow pulse applied to the bandpass filter 8 will cause a sweep of frequency to occur at the output terminal of the dispersive line 9. If the narrow pulse is repeated at time intervals of $\Delta t_1$, as represented by the waveform shown to the left (as viewed) of bandpass filter 8, frequency sweeps are created at that rate at the output terminal of dispersive line 9. Since $\Delta t_1 < \Delta t^1$, the successive frequency sweeps overlap. These frequency sweeps go from high to low frequencies and it is usually necessary to translate the frequency sweeps to a higher frequency range, nearer the input signal range $(f_o)$ to $(f_o + \Delta f)$, before they are mixed with input signals applied to terminal 1 in mixer 2. To this end the frequency sweeps are applied to a further mixer 10 to which is applied as the second input signal a signal of frequency $(f_L + f_o + 66 f + f_3)$ from a local oscillator 11. The output terminal of mixer 10 is connected to a bandpass filter 12, having a pass band of from $(f_o + f_2)$ to $(f_o + \Delta f + f_3)$, provided to select one of the product side-bands of the mixing process in mixer 10, in this case the upper sideband. The pass-band characteristic of filter 12 is illustrated below block 12. The output terminal of filter 12 is connected to mixer 2 which, like mixer 2 of FIG. 2, also has applied to it input signals to be analyzed applied to terminal 1. The output terminal of the mixer 2 is connected via wide band filter 6 to dispersive delay line 7. The output terminal of dispersive delay line 7 is again connected to final output terminal 5. That part of the arrangement shown in FIG. 3 comprising mixer 2, wide band filter 6 and dispersive delay line 7 operates in similar manner to the corresponding part of the arrangement shown in FIG. 2.

It is undesirable that unwanted mixing products should be produced in mixer 10 or 2. This is particularly so in the case of mixer 2, and at least this mixer is a multiplicative mixer.

The output at terminal 5 consists of the spectrum $f_o$ to $(f_o + \Delta f)$ displayed in a time $\Delta t_1$ with successive sweeps truly contiguous. Coherence is achieved, in those cases where coherence is required, by locking in frequency the pulse rate ($1/\Delta t_1$) of the narrow pulses applied to bandpass filter 8 to the output frequency $(f_L + f_o + \Delta f + f_3)$ of the local oscillator 11.

The fact that coherence may readily be achieved using the present invention renders it particularly suitable for use in a pulse doppler radar system in which spectrum analysis of a received signal is required after range gating. In such a case a single moving target has a spectral distribution of energy centered on frequencies $(f_o + f_d)$, $(f_o + f_d \pm \Delta f)$, $(f_o + f_d \pm 2\Delta f) \ldots$ and so on, where $f_o$ is the I.F. frequency of the radar $f_d$ is the doppler frequency shift due to the moving target and $\Delta f$ is the radar pulse repetition frequency.

All of these frequencies may be made phase-related, since in a pulse doppler radar $(f_o)$ can be locked to $\Delta f$. Thus the output of the spectral analysis will show, at the same instant, a doppler frequency $f_d = 0$ (stationary target) at the start of one sweep and a frequency $f_d + \Delta f = \Delta f$ at the end of the previous sweep. The signals will add coherently and thus reinforce one another rather than cancel.

I claim:

1. A spectrum analyzer of the kind comprising means for mixing input signals to be analyzed with a repeatedly swept frequency signal to provide output signals which are related to a time period in dependence upon the frequency of the input signals corresponding thereto including for producing said repeatedly swept frequency signal, dispersive delay means, bandpass filter means, means for applying a train of relatively narrow pulses to said dispersive delay means via said bandpass filter means, said bandpass filter means having a bandpass characteristic such as to reduce the impulse spectrum of each of said narrow pulses at least approximately to match that of said dispersive delay means, and means for applying output signals from said dispersive delay means to said means for mixing input signals.

2. A spectrum analyzer as claimed in claim 1 including a local oscillator and frequency mixing means and wherein said dispersive delay means is connected to apply output signals from said dispersive delay means to said frequency mixing means to which input signals are also applied from said local oscillator, means being provided for applying translated frequency swept signals derived from said frequency mixing means to said means for mixing input signals.

3. A spectrum analyzer as claimed in claim 2 and including a bandpass filter arrangement connected between said means for mixing input signals and said frequency mixing means.

4. A spectrum analyzer as claimed in claim 3 and wherein the arrangement is such that the frequency swept signals derived from said dispersive delay means are translated in said frequency mixing means to a frequency range closer to and below the frequency range of signals to be analyzed, said bandpass filter arrangement being provided to pass the upper of the two side bands produced by said frequency mixing means.

5. A spectrum analyzer as claimed in claim 3 and wherein the arrangement is such that the frequency swept signals derived from said dispersive delay means are translated in said frequency mixing means to a frequency range closer to and above the frequency range of signals to be analyzed, the said bandpass filter arrangement being provided to pass the lower of the two side bands produced by said frequency mixing means.

6. A spectrum analyzer as claimed in claim 2 and wherein at least said means for mixing input signals is a multiplicative mixer.

7. A spectrum analyzer as claimed in claim 2 and wherein the relationship between the characteristic of said bandpass filter means and the characteristic of said dispersive delay means is such that the linear portion of the dispersive delay means extends into the skirts of the bandpass characteristic of said bandpass filter means.

8. A spectrum analyzer as claimed in claim 2 including further dispersive delay means and a wide bandpass filter arrangement and wherein means are provided for applying output signals produced by said mixing means for mixing input signals to said further dispersive delay means via said wide bandpass filter arrangement, said wide bandpass filter arrangement having a pass band characteristic which is at least approximately matched to the dispersive delay characteristic of said further dispersive delay means, and means for deriving output signals from said further dispersive delay means for utilization.

9. A spectrum analyzer as claimed in claim 2 and wherein means are provided for phase-locking the repeat frequency of said narrow pulses to the frequency of said local oscillator.

* * * * *